Dec. 16, 1969 J. R. DENNER 3,484,165

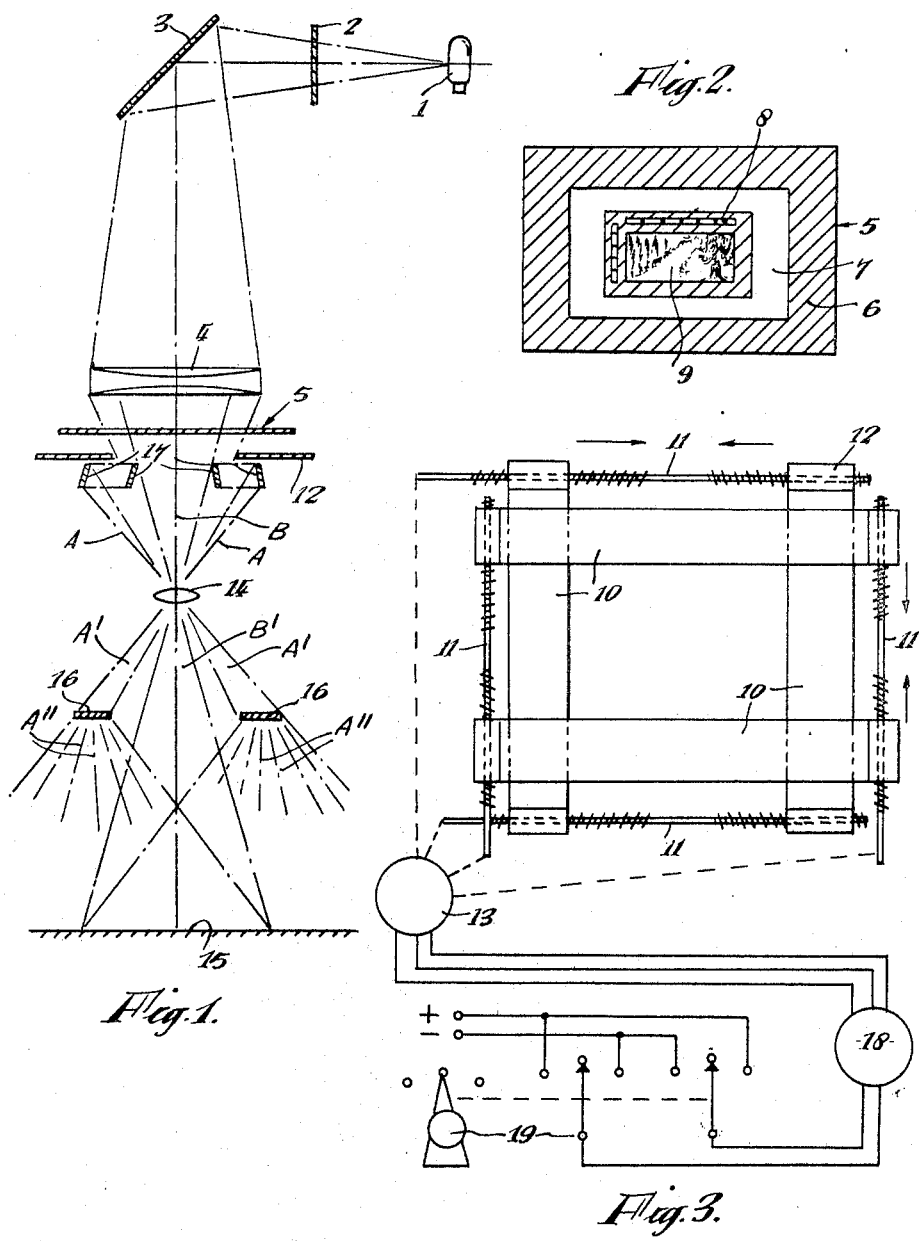

MEANS FOR AND METHOD OF APPLYING FLASH AND MAIN EXPOSURES

Filed March 7, 1967 2 Sheets-Sheet 2

United States Patent Office

3,484,165
Patented Dec. 16, 1969

3,484,165
MEANS FOR AND METHOD OF APPLYING FLASH AND MAIN EXPOSURES
James R. Denner, Shepton Mallet, England, assignor to W. H. Howson Limited, Seacroft, Leeds, England, a company of England
Filed Mar. 7, 1967, Ser. No. 621,264
Claims priority, application Great Britain, Mar. 9, 1966, 10,327/66
Int. Cl. G03b *27/54, 27/28*
U.S. Cl. 355—67                                4 Claims

ABSTRACT OF THE DISCLOSURE

A photographic lighting process and apparatus employing either a camera or enlarger. When an enlarger is used, a conventional enlarger and light source produces an enlarged image of a transparency on its easel. In one form, light passes unimpeded around the edges of the transparency and through the projection lens, after which it passes through a diffusing screen to cast even illumination on the easel. A shutter controls the amount of light thus allowed to by-pass the transparency. In another form, a camera obtains uniform illumination at the focal plane of the objective lens by providing an array of apertures surrounding the lens through which unfocused light from the subject may pass to the focal plane. A diffusing screen is located adjacent the apertures and a control for the effective aperture is provided.

BACKGROUND OF THE INVENTION

A flash exposure is a non-image-forming exposure which is given to the whole area of a photographic material, particularly in colour separation and monochrome processes and particularly when printing through half-tone screens. The flash exposure in spite of its name is not necessarily of briefer duration than the main exposure and may be given for the same length of time as the main exposure. This latter is preferred because of the elimination of duplicate timing apparatus.

The main exposure is that exposure which gives a focussed image on the photographic material being exposed. The amount of light given during a main exposure is determined by the amount of light falling on the highlight parts of the image being presented and the amount of light given during a flash exposure is determined by the amount of light falling on the shadow parts of the image, the ratio between the two exposures being given to preserve a desired balance in the finished photographic material.

These two exposures are given both in cameras during the preparation of a plate and in enlargers during the exposure of a record.

Using two different sources for the two types of exposure brings many difficulties if really accurate work is required. Not least of these is the need for providing and adjusting two sets of lighting equipment, and timing the exposures if they are not to be applied concurrently. It is mechanically inconvenient to mount extra flash lamps outside an enlarger body. In a camera, use of two sources necessarily involves two operations, one the exposure to the image, the other the exposure (either through the lens or by opening the camera) to flash-exposure light. But the more serious difficulty occurs in high-accuracy colour separation work. Hardly ever will two light sources be of exactly the same colour-temperature. The response curve of photo-electric cells to the two sources will therefore be different. Meter readings derived from such cells and purporting to give a measure of light value will therefore not give truly comparative values when different filters are interposed or when any change is made in the positioning of the enlarger head relative to the cells. The stopping effect of the lens or of the filter is different on light deriving from different colour-temperature sources, and if the response of the cells is also different, as it is, there is no way of determining and correcting the error introduced and balance as between highlight and shadow in the different records is likely to be faulty by a small but significant amount.

An object of the invention is to provide a method and means whereby the flash and main exposures can be applied from a single light source. Separate control and adjustment and timing of two light sources can be thus avoided and the colour-temperature of the light for the two exposures is necessarily identical. In the case of the enlarger the light source will be the light source within the enlarger, in the case of the camera the light source is that object which is being photographed, from which light enters the camera.

SUMMARY OF THE INVENTION

According to one aspect of the present invention I provide a method of applying flash and main exposures to photographic materials from a single light source. The method may consist in passing light from that source through a focussing device to produce a light beam for forming an image on the material and diffusing light from the same source into the area of the image, from regions surrounding the image-forming light.

According to a second aspect of the invention I provide means adapted for the application of flash and main exposures to photographic material from a single light source, the means having a focussing device for forming an image on the material with light derived from that source, diffusion means for diffusing into the area of the image light from the same source.

When the means are provided in a camera, the diffusion means consist preferably of a ring (which may be interrupted), of light diffusing material surrounding the lens of the camera, the ring passing light into the camera and onto the film or plate from the object being photographed without any focussing effect. The amount of light so passed may be adjustable, so that flash and main exposures may be adjusted independently to appropriate levels.

In the case of the enlarger, preferably the diffusion means consist of a frame or ring (which may be interrupted), diffusion material surrounding the image-forming beam of light between the objective lens and the easel, and intercepting a non-image forming beam of light surrounding that beam, to diffuse light from that non-image forming beam onto the area of the image formed on the easel. Means for controlling the amount of light so diffused may consist of an adjustable mask placed adjacent to the record carrier above the objective of the enlarger so that flash and main exposures may be adjusted independently to appropriate levels.

In another aspect of the invention, I provide a photographic transparency carrier for use in the enlarger, which consists of a transparency surrounded if desired by by a scale or record forming area, surrounded on all sides of the negative by an area of clear transparent material.

DESCRIPTION OF THE DRAWINGS

Embodiments of the invention, in an enlarger and in a camera are illustrated in the accompanying drawings wherein:

FIGURE 1 is a diagrammatic representation of the light path of light through an enlarger, FIGURE 2 shows in face view a transparency carrier for use in the enlarger, FIGURE 3 shows an adjustable diffusion or masking means for use in the enlarger.

PREFERRED EMBODIMENTS

Figure 4:
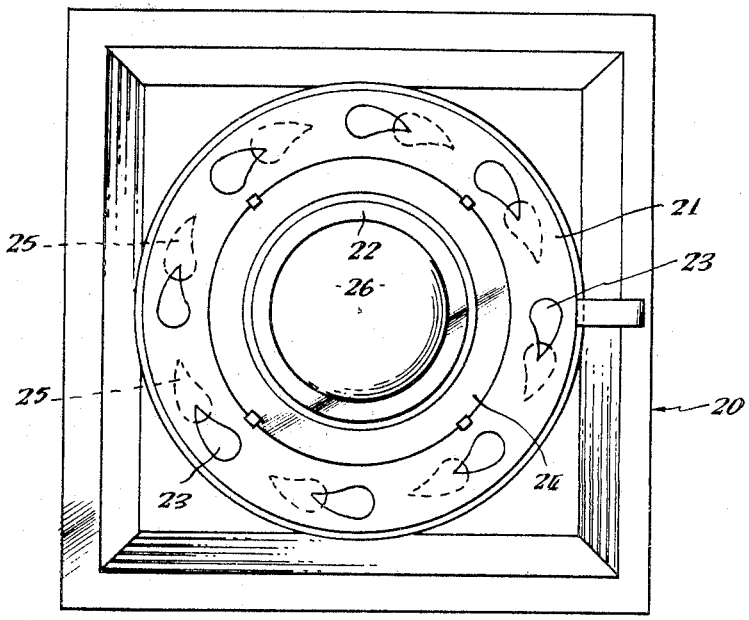
FIGURE 4 is a face view of a camera.
Figure 5:
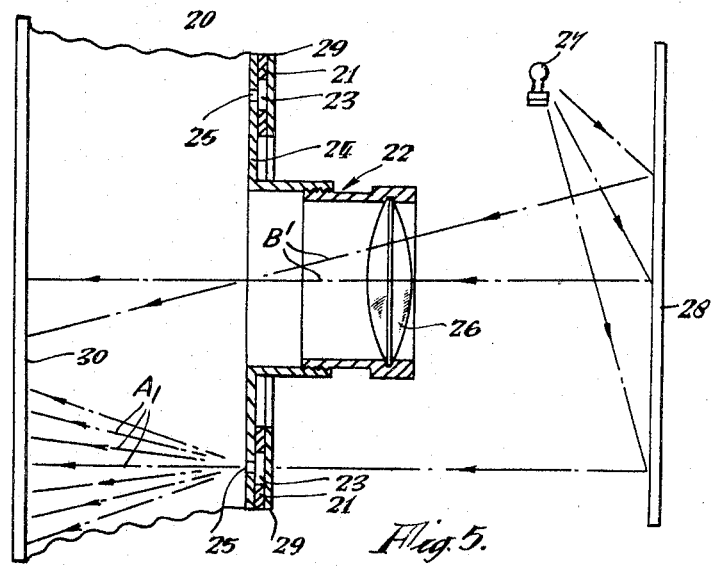
FIGURE 5 is a section on line V—V, FIGURE 4.

The enlarger of FIGURES 1 to 3 has a light source 1 from which light passes through a filter 2 before being reflected by a mirror or prism 3 to pass on to a condenser 4 and a negative carrier 5. The negative carrier, which is shown in FIGURE 2, consists of a plate of glass (which could be replaced by transparent plastic material sheet) having an opaque border 6 within which there is a clear glass area 7 surrounding a translucent portion containing a step-wedge 8 which in turn surrounds the transparency 9 at the centre of the carrier. The carrier can be held in position in the enlarger by means which are not relevant to this invention.

Below the negative carrier there is an adjustable mask 12 which is constructed in the manner illustrated in FIGURE 3. The adjustable mask 12 is made up of four opaque strips 10 movable mutually together or apart by double threaded rods 11 driven in rotation by a slave motor 13 controlled from an impulse generator 18, actuated from a switch 19 by the operator. The adjustable mask formed by strips 10 limits the amount of light which proceeds through the clear glass area 7 to the objective lens 14 of the enlarger.

Just below the mask 12, mirror pairs 17 intercept light which passes through the clear part 7 of the holder and doubly reflect it outwardly and then towards the lens 14 of the enlarger. As seen from the lens, therefore, the light A bearing no image appears to come from an area spaced well away from the transparency. The cones or pyramids of light are separated and it is easier to position effectively a diffusion means 16 (which will be described) than if the cones were contiguous. The light in this area A, A' carries no image, and surround the image-forming beams B, B' of light. After passing through the lens, the image-forming beams B are focussed, and when they fall upon an easel 15 form an image of the transparency. At a convenient position between the lens 14 and the easel 15 there is placed, surrounding the image-forming beams B', an adjustable diffusion device 16 exactly analogous to the adjustable mask 12 except that the strips are strips of diffusion glass (which may be suitably mounted with re-inforcing metal if desired), and these diffusion glasses can intercept light in the beams A', which passed through the clear area 7 of the transparency carrier and diffuse light from outside the area of the image forming beam B' into that area. The effect of this is that non-focussed light A" derived from light source 1 falls evenly over the area of the image on the easel, so that light source 1 provides light both for main and flash exposure in the enlarger.

The ratio between the amount of non-focussed light falling from the diffusing means 16 onto the easel and from the transparency onto the easel is governed by the masking effect of the adjustable mask 12. The nearer this comes to cutting off the non-image bearing beam obviously the higher will be the ratio, image forming light; diffused light, at the easel. It will be possible to place the adjusting mask immediately adjacent the diffusion means, but this is not preferable. The setting of the adjustable mask is best controlled by use of method and means disclosed in my copending U.S. application No. 629,055 filed Mar. 30, 1967 for "Measuring Light."

It may in some circumstances be desirable to provide a mounting for the diffusion means which allows for its adjustment in directions perpendicular to the plane of the easel 15, to allow for varying sizes of transparencies.

An alternative means of by-passing the negative carrier would be flexible glass fibre light-carriers conducting light from the light source of the enlarger to an end below the negative carrier or below the lens, and having at that end a diffusion means to diffuse light passed down the light-carrier.

In some circumstances e.g. when fixed density-range monochrome transparencies are to be used, it may be possible to use non-adjustable mask and diffusion means: e.g. a continuous rectangle of diffusion material surrounding the image-forming beam. Normally however, the adjustability afforded by arrangements such as that previously described will be much preferred.

The masking strips 10 of adjustable mask 12 may be replaced by other movable masking members, e.g. roller blinds, or iris constructions, for controlling the amount of light by-passing the image.

In place of the opaque strips 10, a pair of opaque roller blinds each with a rectangular aperture may be mounted on opposite sides of a rectangular frame structure. The blinds are drawn across to a greater or lesser extent by motors and control such as 13, 18. Variable shuttering occurs only at two sides, since the degree of overlap of the opaque material only varies at those sides, but the evenness of distribution of flash exposure light at the easel should not be adversely affected.

A second particular embodiment of the invention, this embodiment being in a camera 20, has a disc 21 rotatable about the lens mounting 22 of the camera and has a plurality of generally tangentially disposed pear shaped apertures 23 disposed in it, the ring by rotational movements relative to the front face 24 of the camera (which front face supports the lens mounting), variably controlling the amount of light passing through registering apertures 25 in the front face of the camera. The pear shaped apertures 23 are covered by a sheet of diffusing material 29, e.g. diffusing Perspex or glass, and light A' passing through these apertures by-passes the lens 26, (although deriving from the same light source 27 illuminating the object 28, of which the camera is forming a focussed image by focussing light beams B' through its lens) and give non-focussed illumination over the whole of the image-receiving area of the photographic material 30 inside the camera. Thus this one source gives both flash and main exposure in the camera. The control and determination of the ratio between the amount of light received through the lens and through the diffusion means is particularly valuably carried out by the method and means disclosed in my co-pending application.

If the camera is used for colour separation processes, a filter is mounted in front of the camera, to filter all light received by the lens and by the diffusion means.

What I claim and desire to secure by Letters Patent is:

1. Photographic apparatus having a lens, a support for photographic material, the lens to direct an image-bearing beam of light to photographic material on the support, means permitting non-image bearing light from the same source as the image-bearing beam to surround the image-bearing beam, diffusion means to diffuse said non-focussed light from surrounding the image-bearing beam evenly onto the area of the image on the photographic material.

2. Photographic apparatus according to claim 1 wherein the non-image bearing beam passes through the lens and means are provided to divert its path away from that of the image-bearing beam before passing through the lens.

3. A photographic enlarger comprising a carrier for a transparency, a light source, a carrier for holding a transparency in line for light from the source to pass through it as an image-bearing beam, an easel for supporting photographic material in line to receive an image carried by the image-bearing beam, a lens between the carrier and the easel for focussing said image on the easel, means for passing light from said source around a transparency on the carrier and through said lens to form a beam of non-image bearing light, said image-bearing and non-image-bearing light beams passing through the lens to form inner and outer coaxial cones of light, an adjustable masking element between a transparency on the carrier and the lens for adjusting the ratio between the amounts of light in the image-bearing and non-image-bearing beams, and diffusion means for dispersing the non-image bearing light over the image of the transparency received on said photographic material on the easel.

4. The enlarger of claim 3 wherein the diffusion means are adjustable to control the amount of dispersion of the non-image-bearing light.

References Cited

UNITED STATES PATENTS 3,263,584   8/1966   Knus _____ 355—67 X

NORTON ANSHER, Primary Examiner

R. A. WINTERCORN, Assistant Examiner

U.S. Cl. X.R.

353—97, 120; 355—70, 126